Patented Mar. 8, 1932

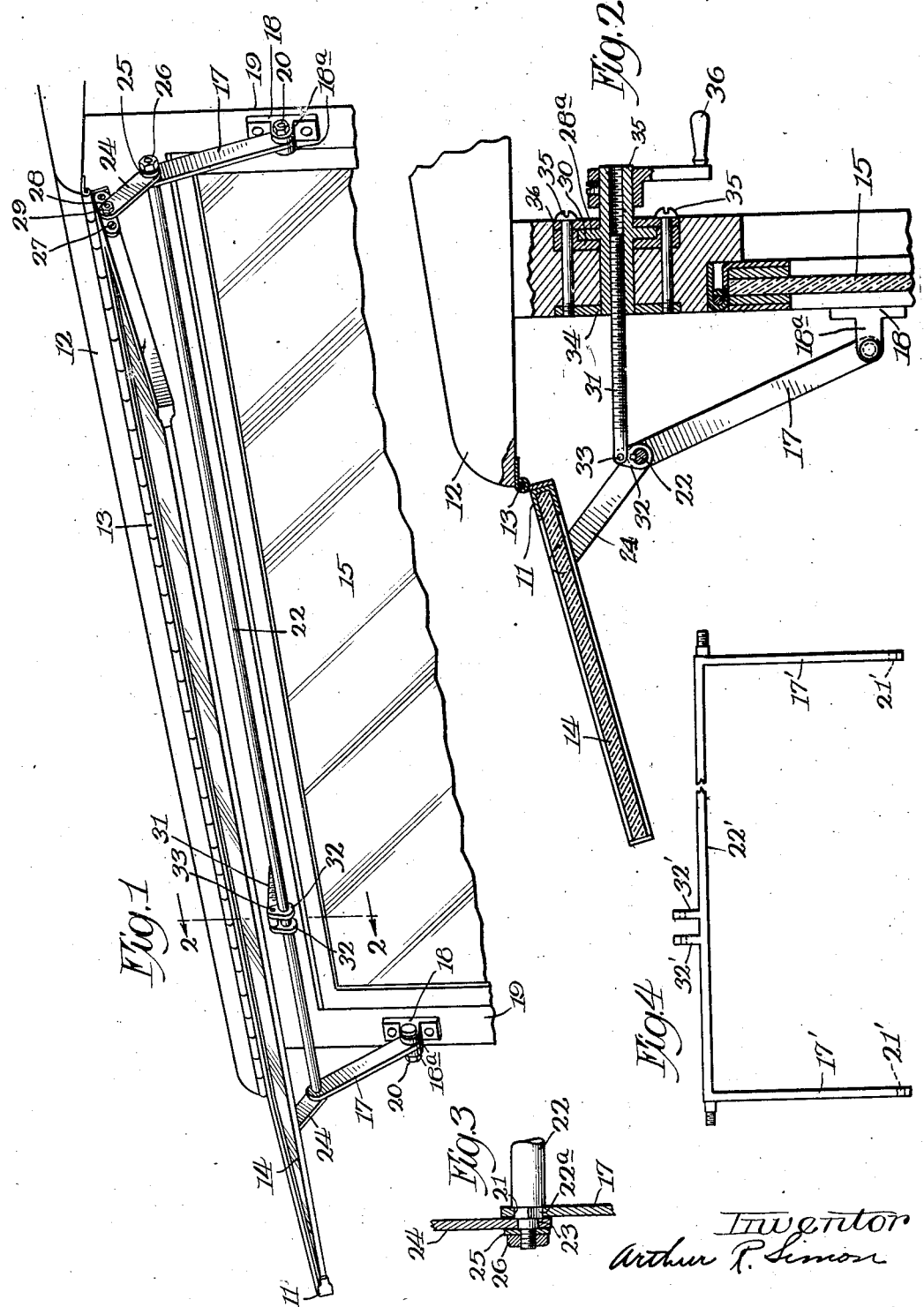

1,848,909

UNITED STATES PATENT OFFICE

ARTHUR R. SIMON, OF LA PORTE, INDIANA

VISOR STRUCTURE

Application filed June 15, 1928. Serial No. 285,585.

My invention relates generally to visor structure for motor, and other, vehicles and has to do particularly with mechanism for supporting and adjusting the same.

One of the objects of my invention is to provide a simple and inexpensive mechanism for supporting the visor for adjustment at will from the interior of the vehicle.

Another object is to provide mechanism of the foregoing character which is quick-acting in operation and self-locking in any adjusted position, such mechanism also being adapted to provide a rigid support for the visor during adjustment and in any of its positions of adjustment. To this end I provide a toggle-action means associated with the ends of the visor exteriorly of the vehicle body, such means being actuated by a single adjusting element for swinging the visor between its "up" and "down" positions.

Other objects are to provide a unitary supporting and adjusting mechanism which may be manufactured, sold and installed as an accessory unit and which may be readily and quickly applied to the vehicle with very little expense; to provide a mechanism of the foregoing character which is capable of withstanding, (without breakage, distortion, rattles or excessive wear), wind pressures, vibration, road-shocks, and other similar conditions to which it may be subjected when placed upon the vehicle; and to provide a visor hingedly supported by the vehicle body in spaced relation to a windshield thereof in such a way that light does not pass between the body and the visor at the point of support thereof.

Other objects and advantages will become apparent as this description progresses and by reference to the drawings wherein,—

Figure 1 is a perspective view of a portion of the front end of the motor vehicle showing my invention applied thereto;

Fig. 2 is an enlarged vertical section taken transversely through the visor and its supporting and operating mechanism of Fig. 1 substantially at the point indicated by line 2—2 of Fig. 1;

Fig. 3 is an enlarged fragmental view, partially in section, showing the end of the cross toggle-operating rod and the toggle means connected thereto; and Fig. 4 is a separated view of another form of adjustable visor supporting member.

The structure which I have chosen to illustrate my invention may take the form of a visor consisting of a frame 11 connected to the forward part of the roof 12 of the vehicle body by means of the close fitting hinge 13. This hinge extends continuously along the inward edge of the visor and is of a character to prevent light from passing between the body and visor along the hinged surface. The visor frame supports, preferably, a suitably colored glass panel 14 adapted to protect the eyes of the occupants of the vehicle from light glares. In some instances, an opaque panel may be substituted for the transparent panel 14 and this may be done without departing from my invention.

In the form shown in the drawings, the visor is mounted forwardly of and in spaced relation to the usual front windshield 15. It will be appreciated that much inconvenience is experienced because of the lights of approaching vehicles (as during night driving), and due to bright sun glare and road-surface glare (as during day driving), and it is highly desirable that the vision of the operator be protected by eliminating these glare conditions. To that end, my visor is adjustable from an "up" position (such as indicated partially in Figs. 1 and 2) to a "down" position substantially parallel with the windshield 15. It is practically essential that the visor be at all times rigidly supported to prevent undue wear, rattles, and to render the visor capable of withstanding maximum wind pressures and other shock conditions set up by the vehicle moving along the road surface without breakage or distortion of the visor and its support.

My invention has to do principally with mechanism for providing the foregoing desirable features and such mechanism, in the form shown, consists of the following:

At each end of the visor, I provide a toggle-action means which comprises an arm 17 hingedly connected to a bracket 18 mounted upon the forward part of the vehicle body as at 19. The bracket 18, preferably, takes a form having bifurcated lugs 18ª between which the end of the lever is received and hingedly secured by the bolt 20. The other end of this toggle arm 17 is provided with a rectangular opening 21 which receives the rectangular end part 22ª of the cross actuating rod 22. Thus, the arms 17 and rod 22 are non-rotatably fixed together so that they swing together about the pivot brackets 18. The end portions of the rod 22 beyond the rectangular part 22ª thereof are circular in cross section and they are adapted to be received in the circular openings 23 of the shorter toggle arms 24. The arms 17, 24 and the cross rod 22 are hingedly secured in the position shown in Figs. 1 and 3 by suitable washers 25 and nuts 26 which engage the extreme threaded end portions of the rod 22. The other ends of the toggle arms 24 are hingedly connected to brackets 27 secured to the inward part of the end edges of the visor frame 11. The brackets 27 may take any desired form having a projecting threaded bolt or pin 28 adapted to receive a fastening member 29 similar to that shown in Fig. 3.

From the foregoing, it is obvious that the visor is rigidly supported at each end by the toggles, and that by simultaneously spreading or collapsing the toggle arms at each end, the visor as a whole will be swung upwardly or downwardly about the hinge 13. The rigidness of support will be maintained both during and after such adjusting movements.

I accomplish the foregoing swinging action by means accessible from within the vehicle body, such means including an actuating mechanism which may be located conveniently to the operator. More specifically, I provide a sleeve 35 rotatively supported in the upper forward part of the vehicle body by a pair of plates 36 and 30. Longitudinal displacement of this sleeve is prevented by the circumferential flange 28ª thereon which rotates in a recess between the two plates referred to. The outer end of this sleeve is further supported by the exterior plate 34 which is held in place along with the plates 36 and 30 by studs 35. The bore of the sleeve 35 is threaded and it receives a rather long and slender adjusting screw 31 which has its forward end extending through the upper forward part of the vehicle body and pivotally connected to the cross actuating rod 22. This connection between the screw 31 and rod 22 is effected by means of a pair of spaced upstanding lugs 32 keyed, or otherwise fixed, upon the rod 22, such lugs having openings adapted to receive a pin 33 which pivotally passes through the projected end of the screw 31. The portion of the sleeve 35 which projects within the interior of the car carries an actuating handle 36 which takes a form which may be readily grasped and operated. It will be understood that the relative lengths of the toggle arms 17, 24 may be varied, and the adjusting screw 31 may be mounted at different heights. This adjusting screw may also be mounted at an angle (other than a right angle) to the plane of the windshield thereby permitting the screw to travel in or along the roof of the car without departing from my invention. In this latter event, the screw may be moved fore and aft by mechanism of any approved character.

In operation, when it is desired to lower the visor from the position shown in Figs. 1 and 2, the handle 36 is turned in a clockwise direction whereby, due to the rotation of the sleeve without longitudinal displacement, the screw 31 is moved inwardly to swing the cross driving rod 22 and long toggle arms 17 inwardly to collapse the toggle arms. The relation between the screw 31 and the rod 22 is such that the movement of the screw is uniformly transmitted to the toggles so that they are operated simultaneously and smoothly without appreciable effort on the part of the operator. To raise the visor, the operation is the reverse of that just described.

The mechanism for moving the rod 22 back and forth is of such character that it is not only quick-acting, but is self-locking so that the visor needs no attention other than that required for the adjusting movements. The quickness and accuracy of adjustment enables the operator to make the adjustments from time to time as the traffic conditions require. For example, during night driving the visor may be lowered to eliminate the glare from the lights of an approaching vehicle and it may then be quickly raised when the vehicle has passed when driving in traffic zones regulated by signal lights which may be at some height above the car, the visor may be raised and lowered, at will, so that the operator may readily observe the signals regardless of the position of the vehicle.

I appreciate that in the movement of the rod 22 back and forth as above described, it takes an arcuate path about the hinge-center 20. In certain forms and sizes of this mechanism, the vertical displacement of the rod 22 during the above movement is so slight that the flexing action of the projecting end of the rather long adjusting screw 31 readily compensates for such vertical displacement without the use of additional displacement-configuration means. However, in some instances, it may be desirable to additionally compensate for this displacement, in which case the opening in the end of the adjusting screw 31 may be slotted, as will be well understood, or any other form of compensating means may be employed without departing from my invention.

The longer toggle arms 17 and the cross driving rod 22 constitute, in effect, a single movable unit. While I have shown the arms 17 and the rod 22 as separate parts, they need not be necessarily so, and in Fig. 4 I have shown another form of my invention wherein these arm parts and the rod are combined as an integral piece. In this form, the arms 17′ of this U-shaped member are provided with openings 21′ for connection to the bracket 18. The integrally connected cross part 22′ is extended at the ends similarly to the rod 22 of Fig. 1 to pivotally receive the shorter toggle arm 24. This cross piece 22′ is provided with integral upstanding lugs 32′ which are adapted to pivotally receive the forward end of the adjusting screw 31 in a manner similarly to the lugs 32. Otherwise, the constuction and operation of the mechanism as a whole is the same as that shown in Figs. 1 and 2.

While I have shown only two forms of my invention, it will be understood that various changes in details and arrangements of parts may be made without departing from the spirit and scope of my invention as defined by the claims which follow.

I claim:

1. In mechanism for supporting and adjusting a visor upon the body of a vehicle, a pair of arms pivotally connected together at one end thereof, there being a pair of said arms located at the opposite ends of said visor, means for connecting one of said arms of each pair to the visor, means for connecting the other arm of each said pair to the vehicle body, a member non-rotatably connected at its opposite ends to said other arm of each said pair adjacent the pivotal connection between said arms, and means for moving said member forwardly and backwardly to move said arms of each pair in spreading and collapsing directions about their pivotal connection.

2. In mechanism for supporting and adjusting a visor upon the body of a vehicle, a pair of arms hingedly connected together at their adjacent ends and located adjacent the opposite ends of said visor, means for connecting one of said arms of each pair to said visor, means for connecting the other of said arms of each pair to the vehicle body, a member non-rotatably connected at its opposite ends to said other arms of said pairs of arms adjacent the pivotal connection between the arms of each pair, means movable forwardly and backwardly and pivotally connected to said member for projecting said member forwardly and backwardly to move said arms about their interconnecting pivotal connections, and means for moving said first means forwardly and backwardly.

3. In mechanism for supporting and adjusting a visor on a vehicle, a toggle at each end of the visor and having one of its arms adapted to be pivotally connected to the visor and its other arm adapted to be pivotally connected to the body of the vehicle, a toggle actuating member connected to one arm of each toggle adjacent the toggle joint between said arms, and means for moving said member back and forth to simultaneously spread and close both said toggles to bodily and uniformly raise and lower said visor, said means including a pivotal connection with said member and an actuator accessible from the interior of the vehicle.

4. In mechanism adapted to support and adjust a visor hingedly connected to a vehicle body, a U-shaped unit having its arms adapted for pivotal attachment to the exterior part of the vehicle body, arms adapted to be pivotally attached to the opposite ends of the visor and also having free pivotal connection with said U-shaped unit adjacent the arms of the latter, a member pivotally attached to said unit intermediate its arms and adapted to be supported by the vehicle body, and means associated with said member and having a part adapted to extend within the vehicle body for moving said member and unit forwardly and backwardly to swing the visor up and down.

5. In mechanism adapted to support and adjust a visor hingedly connected to a vehicle body in spaced relation to a windshield thereof, a U-shaped unit adapted to be mounted to extend laterally and exteriorly of said windshield and having its arms adapted for pivotal attachment to the exterior part of the vehicle body, an arm at each end of the visor at the opposite sides of said windshield adapted to be pivotally attached to the visor and also having free pivotal connection with said U-shaped unit, a member pivotally attached to said unit and supported upon the vehicle body, and means associated with said member and including a handle adapted to extend within the vehicle body for moving said member and unit forwardly and backwardly to swing the visor up and down.

6. The combination with a vehicle body having a windshield, of a visor hinged to the forward part of the vehicle beyond and exteriorly of the windshield and movable up and down relative thereto, and mechanism for supporting and adjusting said visor including a toggle at each end of the visor, each toggle having one arm pivoted to the outer part of the vehicle body and the other arm pivoted to the visor, said arms being connected together for free pivotal movement at all times, a member extending from toggle to toggle and connected to one of the arms of each of said toggles adjacent the pivotal connection between said toggle arms, a reciprocable element pivoted to said member and supported by said body and means accessible from within the body and associated with said element for reciprocating said element to extend and collapse said toggles to move said visor up and down.

7. The combination with a vehicle body having a windshield, of a visor hinged thereto exteriorly spaced from said windshield, a toggle at each end of the visor and pivotally connected to both said body and visor, a member connecting the corresponding arm of each toggle together adjacent the connection between the toggle arms for simultaneous movement of the toggles, an adjusting screw pivoted to said member, an element rotatably carried by said body and associated with said screw to project and retract the latter, and a handle on said element extending within the body for rotating said element.

8. A visor structure adapted to be mounted exteriorly of a vehicle body, including a visor, toggle-action means, including a pair of arms pivotally connected together at their adjacent ends, located at the opposite ends of said visor and having one arm of each said pair of arms pivotally connected to said visor, means for pivotally mounting the other arm of each said pair of arms upon the vehicle body, said toggle means having free toggle action at all times, a connection between the toggle-action means at opposite ends of the visor for causing both said toggle means to move in unison, an actuator pivotally associated with said connection and movable forwardly and backwardly to spread and close the arms of said toggle-action means to raise and lower the visor, and means including a part adapted to extend within the vehicle body for moving said actuator backward and forward.

9. In mechanism for supporting and adjusting a visor on a vehicle, a toggle at each end of the visor and having one of its arms adapted to be pivotally connected to the visor and its other arm adapted to be pivotally connected to the body of the vehicle, a rod rigidly connected at its ends to the corresponding arm of each toggle at the pivotal connection between the toggle arms, an arm carried by said rod in a selected position therealong, and an adjusting member supported by the vehicle body for actuating said arm to move said visor.

10. The combination in a vehicle body, of mechanism for supporting and adjusting a visor on a vehicle, a toggle at each end of the visor and having one of its arms adapted to be pivotally connected to the visor and its other arm adapted to be pivotally connected to the body of the vehicle, a rod rigidly connected at its ends to the corresponding arm of each toggle at the pivotal connection between said toggle arms, an arm carried by said rod in a selected position therealong, and an adjusting screw pivotally connected at one end to the arm on said rod and threaded in the vehicle body for actuating said arm to move said visor, and means mounted in the body for rotation relative to said screw and cooperating with said screw for moving the latter back and forth.

In testimony whereof, I have subscribed my name.

ARTHUR R. SIMON.